United States Patent [19]

Hsu et al.

[11] Patent Number: 4,851,995
[45] Date of Patent: Jul. 25, 1989

[54] PROGRAMMABLE VARIABLE-CYCLE CLOCK CIRCUIT FOR SKEW-TOLERANT ARRAY PROCESSOR ARCHITECTURE

[75] Inventors: Yarsun Hsu; Hungwen Li, both of Pleasantville, N.Y.

[73] Assignee: International Business Machines Corporation, Armonk, N.Y.

[21] Appl. No.: 64,970

[22] Filed: Jun. 19, 1987

[51] Int. Cl.$^4$ .................. G06F 5/00; G06F 5/04; G06F 5/06; G06F 9/38

[52] U.S. Cl. .................. 364/200; 364/228; 364/231.8; 364/232.22; 364/270; 364/270.2; 364/270.5; 364/270.7; 364/271; 364/271.2

[58] Field of Search ... 364/200 MS File, 900 MS File; 371/9

[56] References Cited

U.S. PATENT DOCUMENTS

| | | | |
|---|---|---|---|
| 4,024,498 | 5/1977 | McIntosh | 371/1 |
| 4,040,032 | 8/1977 | Kreiker | 364/200 |
| 4,201,948 | 5/1980 | Natens | 331/8 |
| 4,313,206 | 1/1982 | Woodward | 375/110 |
| 4,393,419 | 7/1983 | Arai et al. | 360/37.1 |
| 4,464,739 | 8/1984 | Moorcroft | 367/130 |
| 4,468,737 | 8/1984 | Bowen | 364/200 |
| 4,482,819 | 11/1984 | Oza | 307/269 |
| 4,493,048 | 1/1985 | Kung et al. | 364/754 |
| 4,507,748 | 3/1985 | Cotton | 364/749 |
| 4,509,120 | 4/1985 | Daudelin | 364/200 |
| 4,509,187 | 4/1985 | Ackland et al. | 381/43 |
| 4,533,993 | 8/1985 | McCanny et al. | 364/200 |
| 4,574,345 | 3/1986 | Kronesky | 364/200 |
| 4,574,394 | 3/1986 | Holsztynski et al. | 382/41 |
| 4,597,076 | 6/1986 | Bingham | 370/85 |
| 4,622,632 | 11/1986 | Tanimoto et al. | 364/200 |
| 4,639,857 | 1/1987 | McCanny et al. | 364/200 |
| 4,665,556 | 5/1987 | Fukushima et al. | 382/41 |
| 4,722,084 | 1/1988 | Morton | 371/9 |

OTHER PUBLICATIONS

Kimmel, Jaffe, Mandeville and Lavin, Mite:Morphic Image Transform Engine an Architecture for Reconfigurable Pipelines of Neighborhood Processors, IEEE Computer Society Workshop on Computer Architecture for Pattern Analysis and Image Database Management—Capaidm, Miami Beach, Fla. Nov. 18-20, 1985.
U.S. Ser. No. 06/902,343 filed 8/29/86—H. Li.

*Primary Examiner*—Archie E. Williams, Jr.
*Assistant Examiner*—Robert B. Harrell
*Attorney, Agent, or Firm*—Philip J. Feig

[57] ABSTRACT

Using a variable-duration clock circuit, together with programmable duration control to alter the clock waveform within strict rules, permits the programmer to arrange appropriately short durations for short data transfers, and to arrange appropriately longer durations for longer data transfers in an array processor of myriad processing elements. There is no need to allow sufficient time in *every* clock cycle for worst case data transfer between remote processing elements.

The clock waveform has three recognizable edges (A,B,C) regardless of loss of sharpness during its travel to the various processing elements. The convention that three skew-sensitive activities, READ, WRITE and OPERAND SUPPLY conform to respectively assigned edges as follows:
A=READ;
B=OPERAND SUPPLY;
C=WRITE (Read next)

The processing elements synchronize with the clock waveform, which is optimized for the instructions of the program being executed. There is no time wasted allowing for worst case data transfers possible in certain instructions but not possible in other instructions.

15 Claims, 1 Drawing Sheet

PROGRAMMABLE VARIABLE-CYCLE CLOCK CIRCUIT FOR SKEW-TOLERANT ARRAY PROCESSOR ARCHITECTURE

BACKGROUND OF THE INVENTION

1. Field of Invention

This invention relates to architecture for array processors made up of interconnected processing elements where all processing elements share a common clock, and particularly relates to architecture for a programmable skew-tolerant array processing system, which uses a variable-cycle clock to maintain synchronism among processing elements scattered among several chassis, or otherwise subject to unacceptable wire delays.

2. Description of the Prior Art

There is a significant body of patent and publication art dealing with array processors, sometimes called image processors. Among array processors deployed, there is a body of art dealing with the interconnections among the great numbers of simple computer cells, each known generally as "processing element" or "PE." Such connections include the simple four-neighbor linear mesh (NESW), the hexagonal mesh and the "hypercube" of sixteen permanent connections. Such connections also include a reconfigurable arrangement of semipermanent assigned connections, published as the Morphic Image Transfer Engine (MITE). A prior patent application by one of the inventors provides program variability at the processing element level by making each processing element separately addressable. Array processors thus have become extremely variable in their processing-element-to-processing-element connectivity and data transfer demands, adding greatly to the already considerable speed-of-light electrical transmission length skew problems by enormously variable process delays, and thus mandating relatively slow clock cycles.

"Skew" is a phenomenon due to the unequal distance a common signal must travel to reach different destinations.

There is no known prior art implementing a programmable variable main clock cycle in an array processor for skew acceptance or control.

There is a general awareness in all data transmission arts of the desire for synchronism, or, failing synchronism, of the desire for return to synchronism by correction or acceptance. The generic term for loss of synchronism is "skew." There are a number of skew correction and skew acceptance techniques known in related arts. Magnetic tape, for example, is subject to linear physical deformation which may cause errors in reading a byte recorded transversely. The solution, in essence, is to skew the reading to match the skew of the tape, using electronic delays which vary track-to-track as a function of measured or predicted skew. In system-to-system communications, such as tape reader input to a computer, provision is usually made to operate with a buffer which can accept data at a first rate and hold it for transfer at a different rate. When the buffer fills, the faster system stops and waits for the slower system to clear the buffer.

In array processors, however, there is little chance to buffer the massive amounts of data passing from processing element to processing element. The "image" applied at the entrance to the array is moved through the array, with a great number of processing changes, until it exits the array or is dissipated in the array. A master clock usually provides the drumbeat which controls the cadence of image march through the PEs of the array. The master clock has a beat frequency slow enough to allow every PE to accomplish its assigned computation and accomplish its assigned data output and input transfers.

A problem arises when the array of processing elements is reconfigurable, as shown by the Kimmel et al MITE publication, because the speed-of-light electrical signal transfer is of variable length, and thus requires variable time. This problem is compounded when the processing element is individually accessible for varying the job and the data transfer characteristics according to programming.

A great number of processing elements, usually the entire array, is subject to the common clock cycle. *Error-free* array processor operation requires that the clock cycle be long enough to carry out the worstcase calculation and data transfer called for by the program. Conversely, *efficient* array processor operation requires that the clock cycle be as quick as possible. These competing requirements present a clock cycle dilemma.

The prior art has not solved the clock cycle dilemma for array processors; prior array processors operate on a common clock cycle which does not vary.

The following patents are representative of prior art:

U.S. Pat. No. 4,024,498, McIntosh, APPARATUS FOR DEAD TRACK RECOVERY, May 17, 1977, shows an automatic variable synchronized multiple clock scheme, for the NRZI tape data format, to recover a lost track by using for a given track a clock signal ranging from 1 unit of length to 2 units, 4 units up to 8 units.

U.S. Pat. No. 4,040,032, Kreiker, PERIPHERAL DEVICE CONTROLLER FOR A DATA PROCESSING MACHINE, Aug. 2, 1977, shows multiple synchronized clocks in a bus protocol to control peripheral devices attached to the bus.

U.S. Pat. No. 4,201,948, Natens, PHASE-LOCKED LOOP CLOCK PULSE EXTRACTION CIRCUIT, May 6, 1980, shows a phase-locked loop scheme to correct the clock skew. The phase comparator produces first and second intermediate pulse waveforms constituted by differente portions of the pulses of the input waveform and proportional to the pulse density.

U.S. Pat. No. 4,313,206, Woodward, CLOCK DERIVATION CIRCUIT FOR DOUBLE FREQUENCY ENCODED SERIAL DIGITAL DATA, Jan. 26, 1982, shows a circuit using four clock inputs (the unit clock, the $\frac{1}{4}$ clock, the 2/4 clock and the $\frac{3}{4}$ clock waveforms) to derive a combination of all possible clock edges. This operates on a non-return-to-zero data signal to reconstitute a fixed-frequency clock from guaranteed events (transitions) of the data stream.

U.S. Pat. No. 4,393,419, Arai et al, SYNCHRONIZING SIGNAL DETECTION PROTECTIVE CIRCUIT, July 12, 1983, shows an automatic circuit to correct "microscopic" clock skew of a degree of few transistors. When skew does not occur, the signal with a short gating duration is selected, and only when skew, dropout, jitter or the like occurs the signal with a long gating duration is selected.

U.S. Pat. No. 4,464,739, Moorcroft, SAMPLED TOWED ARRAY TELEMETRY, Aug. 7, 1984, shows a data acquisition scheme for an acoustic detection system. The triggering edge of the clock is applied to all data acquisition modules simultaneously; each module controls the delay of the trailing edge, which thus adjusts the standard clock to a variable cycle appropriate for the module. The modules are in series for sequential data collection.

U.S. Pat. No. 4,468,737, Bowen, CIRCUIT FOR EXTENDING A MULTIPLEXED ADDRESS AND DATA BUS TO DISTANT PERIPHERAL DEVICES, Aug. 28, 1984, shows a circuit and a bus protocol to *eliminate* clock skew for remote peripheral devices. "Retime logic" regenerates the timing and control signals.

U.S. Pat. No. 4,482,819, Oza, DATA PROCESSING SYSTEM CLOCK CHECKING SYSTEM, Nov. 13, 1984, shows a scheme to correct skew by sending a reference clock through a set of wires with identical length.

U.S. Pat. No. 4,493,048, Kung et al, SYSTOLIC ARRAY APPARATUSES FOR MATRIX COMPUTATIONS, Jan. 8, 1985, shows a systolic array system forming a mesh for digital signal processing problems via synchronizing the data flow in the mesh along *simple and regular (hexagonal mesh or linear mesh) communication paths.*

U.S. patent application Ser. No. 06/902,343, POLYMORPHIC MESH NETWORK IMAGE PROCESSING SYSTEM, by H. Li, filing date, Aug. 29, 1986. Li shows an architecture for an array processor in which each PE has a mesh connection determined by an addressable switching network within the PE.

The following publication is representative of the prior art:

1. Kimmel, Jaffe, Mandeville and Lavin, MITE: MORPHIC IMAGE TRANSFORM ENGINE AN ARCHITECTURE FOR RECONFIGURABLE PIPELINES OF NEIGHBORHOOD PROCESSORS, IEEE Computer Society Workshop on Computer Architecture for Pattern Analysis and Image Database Management—CAPAIDM, Miami Beach, Fla., Nov. 18-20, 1985.

The prior art provides for extending clock edges with limited length. The prior art solves skew problem at a "microscopic" level at the degree of skew of a few transistors delay.

In the usual digital system, the skew is taken care of by considering the worst case skew in related components of the system. Since the multiplicity of the usual digital system is not significantly great, the skew can usually be properly handled within the range of a few transistors. This is called "microscopic" skewing.

In a mesh-type (SIMD) Single-Instruction-Multiple-Datastream parallel processor, there is an array of individual processing elements which operate during a common clock cycle to carry out a common instruction on dynamically changing image data as the data is processed during passage through the array. It is common for data to pass from a first processing element to its immediate neighbor processing element, but data transfers from first processing element to a remote processing element are also useful. The skew in data transfer time in such short or long transfers must be accommodated and usually is accommodated by selecting the clock cycle so as to provide sufficient time for the worst case, that is, for the longest possible duration data transfer.

However, when multiplicity is great, such as in an SIMD parallel processing system consisting of 512×512 processing elements, each a small computer, the skew phenomenon becomes "macroscopic" and can range from a few transistors in a chip to several thousands of logic gates in the system, spread across many chips interconnected by boards, wires or even cables to other frames. Without proper handling, the "macroscopic" skew can cause significant performance degradation.

An SIMD parallel processing system consisting of N processing elements is very popular for image processing and computer vision applications. For such applications, it is usually organized as an M×M square mesh where M is the square root of N and each processing element is designated as PE(i, j) where both i and j run from 1 to M. Each processing element in the SIMD system receives a clock signal and a broadcast instruction, both of which are distributed by a central controller. It is the unequal amount of time required by the clock and the instruction to travel from the central controller to an arbitrary group of processing elements that causes the skew.

The skew for a pair of processing elements PE(s, t) and PE(m, n) is the time difference, d, the clock and the instruction arrive from the central controller. Accordingly, the skew of an SIMD parallel processing system "D" is the maximum of "d" among all s, t, m and n.

The performance degradation of an SIMD parallel processing system caused by the skew is profound. An activity that can be completed in an amount of time "R" can now only be completed in "D+R" to accommodate the skew. As a result, a symmetrical clock that considers the skew pays an overhead of D/R and incurs a performance degradation at that amount.

The overhead due to the skew in a single cycle is accumulative in the interprocessor communication of an SIMD parallel processing system. This leads to a very significant performance degradation. For example, when PE(s, p) wishes to communicate with PE(s, q) the value of PE(s, p) is passed to PE(s, p+1), then PE(s, p+2) and eventually reaches PE(s, q). Consequently, it takes (q−p) cycles (assuming q>p) each of which includes an overhead "2D". The total overhead caused by skew in interprocessor communication is (q−p) * (2D). Such an overhead is the most significant reason why large SIMD systems suffer high interprocessor communication penalty.

It is also true that the skew is heavily dependent on the size of the SIMD system (total number of PEs), the relative layout of PEs, the packaging technology and the local skew caused by the components within the system. A conventional non-programmable approach in handling the skew needs a redesign for each new system with different parameters.

SUMMARY OF THE INVENTION

The invention describes a programmable skew-tolerant array processor architecture that eliminates the performance degradation due to skew in an SIMD parallel processing system consisting of a large array of processing elements. The invention comprises of a clock signal generator and a circuit for the generator. The clock signal generator has a configured clock waveform with three recognizable edges:

Edge A, READ;
Edge B, OPERAND SUPPLY, and
Edge C, WRITE==also Edge A of the next cycle.

The edges are recognizable regardless of the spatial location of all pairs of communicating processing elements in the SIMD system.

The duration between edge A and edge B is programmable and is subject to the necessity of the communication and the physical distance the communication signal travels. When multiple pairs of processing elements communicate simultaneously, the programmability adjusts the duration to accommodate all pairs of communication.

The circuit for the clock generator uses a table and a combinatorial logic to fulfill the programmability in generating arbitrary duration. The table contains the length of the desirable duration between edges A and B. The entry of the duration in the table is addressed by an external inquiry and is compared with a baseline reference clock with half of its period equal to the duration between edge B and edge C. When the number of passing edges of the baseline clock is smaller than content of the addressed table entry, the combinatorial logic suppresses the edge of the baseline clock from appearing. At the output of the combinatorial logic, a clock waveform is generated subject to the desired duration specified to the clock generator. The skew factor is considered and is adjusted by the table entry, and therefore can be resolved by the same mechanism when technology and engineering implementation change. Hardware is provided to extend the A-B portion of the clock pulse to allow for distance between affected processing elements. Table lookup in memory, or equivalent calculations, easily suffices.

It is expected that certain processing-element-to-remote-processing-element transfers involve shortcircuit passage through intervening processing elements, which causes very fast but measurably delayed arrival of operands. These propagation delays are accommodated by the extended duration of the A-B portion of the clock pulse.

DESCRIPTION OF A PREFERRED EMBODIMENT OF THE INVENTION

Programmable table lookup means determines the A-B portion of the skew-tolerant clock pulse. Table entries may be set permanently at manufacture, or reset at any time. The table is accessed automatically during running of the program to respond to the data transfer needs of the program.

It is known that certain transfers will involve simple neighbor-to-neighbor transfers between processing elements. Other transfers will involve measurable propagation delays even as transfer is made by direct, short-circuit passage through a great many intervening processing elements. Time must be allowed for measurably delayed arrival of operands. These propagation delays are accommodated by extending the duration of the A-B portion of the clock pulse.

Figure 1:
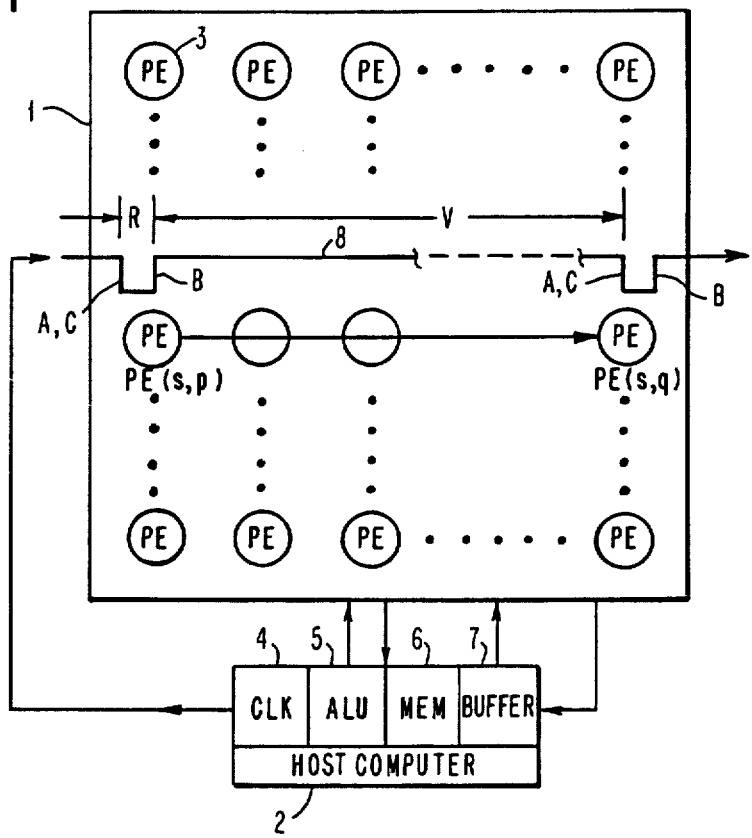
FIG. 1 is a schematic system diagram of a large SIMD array processor with the programmable skew-tolerant clock waveform overlaid, showing three edges for the skew-sensitive activity: the READ, OPERAND SUPPLY, and WRITE.

FIG. 1 shows a large SIMD array processor with an example of a transfer from first Processing Element PE(s, p) to a remote second SE (s, q) showing also the programmable skew-tolerant clock waveform 8 of this invention. The programmable skew-tolerant clock waveform enforces a convention that three skew-sensitive activities:
READ;
OPERAND SUPPLY; and
WRITE
must be conformed to three edges of the waveform.

The SIMD array processor includes a large processing element array 1 and a host computer (H) 2. The processing element array includes a large number of individual processing elements (PEs) 3 interconnected for data transfer of a limited nature. A first PE 3 connects to its N,E,S,W neighbors, but does not connect directly to each and every other PE because the connection complexity would be too great. Array processing takes place by passing an "image," which may be a picture or other pattern of data representable by a matrix of digital values which may be called pixels.

Host computer 2 is the overall controller. It includes programmable skew-tolerant clock (CLK) 4, arithmetic and logic unit (ALU) 5, memory (MEM) 6 and buffer 7, interconnected appropriately for array processing by PE array 1. Memory 6 and buffer 7 may be implemented as a single entity; the functions may be physically identical but have recognized differences in operational assignment.

In a typical operation, an image is acquired by image acquisition means (not shown) and put into buffer 7. Host computer 2 is programmed to control processing the image to find certain features of the image. 2 compiles the program, sets up the instructions for the PEs, and controls the sequence of processing. Intermediate processing results may pass to and from PE array 1 to buffer 7, in ordinary image processing procedure.

Programmable Skew-Tolerant Clock Waveform

The skew-tolerant waveform 8 consists of three edges defining two parts shown in FIG. 1. The front part is of variable length "V" while the tail part is of fixed length "R," where "R" is the time required for Arithmetic Logic Unit operation. The waveform, shown as a clean rectangular voltage diagram, will in practice be significantly deformed as it flows through the array 1, but it continues to have three recognizable edges "A", "B" and "C" along which skew-sensitive activities are to be conformed.

Edge "A" indicates the beginning of all READ activities, including READing from memory and registers. Edge "B" signals the availability of all OPERANDs which may come locally from memory, register or combinatorial logic. Operands can also come remotely from the memory, register and combination logic of other processing elements. Finally, the edge "C" is to enforce the WRITE activities including writing the results of Arithmetic Logic Unit, the registers and the combinatorial logic to memory and/or registers. Note that edge "A" and edge "C" are coincident in place when the waveform repeats itself.

When provided a base-waveform with period 2*R for communication between a pair of processors PE(s, p) and PE(s, q), q>p, the skew-tolerant waveform is generated as follows:

The tail part of the waveform is generated by the second half of the base-waveform with period 2*R while the generation of the front part of the waveform is generated by skipping "L" negative-going edges of the base-waveform where "L" is a function of (q−p), the system size, the layout of processing elements, the packaging technology and the skew characteristics of all components within the SIMD parallel processing system.

Circuit for Generating the Skew-tolerant Waveform

Figure 2:
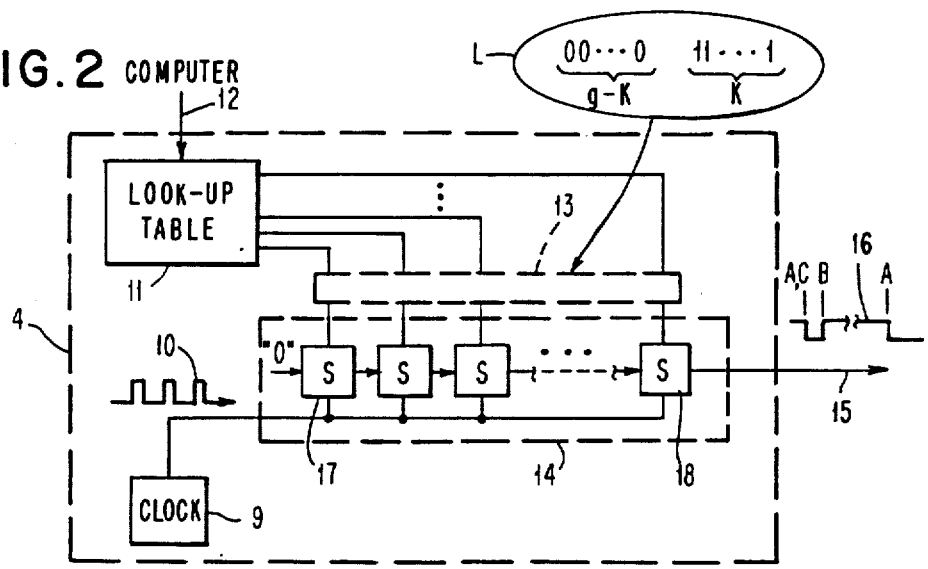
FIG. 2 is a composite drawing showing the mechanism to generate the programmable skew-tolerant clock waveform with programmable variable length.

FIG. 2 depicts the schematic diagram of a skew-tolerant variable-cycle clock 4 for generating the skew-tolerant waveform for the SIMD parallel processing system. A baseline clock 9 provides base-waveform inputs with Period 2*R to the circuit as shown by the base-waveform 10. The skew-tolerant clock waveform 16 results from the combining of an integer n quantity of the baseline clock pulses, waveform 10, as specified by skew-tolerance tables in DISTANCE/LENGTH TRANSLATION block 11. The block 11 comprises tables which provide control signal values as specified by the host computer 2 on line 12 and by broken line box 13 of lines to the control inputs of shift register 14. Box 13 connects the output of table 11 and provides a set of control inputs to shift register 14; together box 13 and box 14 form COMBINATORIAL means, or a COMBINATORIAL block. This skew-tolerant-table-controlled shift register 14 in turn provides as output on line 15 the skew-tolerant variable-cycle clock pulse 16. Shift register 14 includes an appropriate number of shift register stages 5 including first stage 17 and final stage 18.

Alternatively, the variable-cycle clock pulse may be produced by a COMBINATORIAL block of baseline clock, counter and latch combination, with the table 11 providing counter settings. The result is a skew-tolerant-table-controlled variable-cycle clock waveform, specified by the DISTANCE/LENGTH translation block 11, and implemented by the COMBINATORIAL block 13, 14.

The DISTANCE/LENGTH translation block 11 accepts the "distance n" 10 as input and generates "Length L" as output. In the preferred embodiment, this block 11 is implemented as a look-up table by commercially available memory with "n" as the address of the memory and "L" as the content of the memory. The content of the memory is preloaded into the table before the operation of the SIMD system and the value of the content considers all aforementioned parameters that affect the skew.

The format of the DISTANCE/LENGTH table is a d x g programmable memory, which has d words and g bits per word. The memory content is preloaded with the desired duration between edge A and edge B. Each entry of the memory is a unique pattern consisting of K "1"s in the lower bits following (g-K) "0" higher bits. A pattern of such is shown related to box 13 in FIG. 2.

The COMBINATORIAL block accepts "L" and the base-waveform 10 as the inputs and generates a signal 16 on line 15 as output. A pattern "L" is selected by "distance" out of the memory which implements the DISTANCE/LENGTH TRANSLATION table 11, and is loaded in parallel to the COMBINATORIAL MEANS, which in the preferred embodiment shown in FIG. 2 includes the inputs denoted by box 13 and the g-stage shift register 14. Each shift register stage accepts one corresponding bit of the "L" pattern. The shift register stage 17 corresponds to the highest "L" bit. Every shift register stage accepts the baseline clock 10 as control to trigger the data shifting.

The edge A is generated at the output on line 15 of the last shift register 18, once the "L" pattern is moved to the shift register 14 stages. The "L" pattern is shifted to the lower-bit direction (right) on every pulse of the baseline waveform 10. On every shift, the left-most shift register stage 17 is replaced with "0." It therefore takes K pulses to move all K "1"s to the rightmost shift register. In the next control pulse, all shift register stages are cleared so that the negative-going edge "B" is generated. The COMBINATORIAL block is ready to repeat the above process for the generation of the next A edge. Since the repetition of the same process takes at least one pulse 10, the duration between edge B and C is at least one pulse (or "R") apart which is sufficient for the ALU operation.

Interprocessor Communication Using Skew-Tolerant Waveform

The skew-tolerant clock waveform is used to facilitate the communication between a pair of processors in a large SIMD system. To let PE(s, p) communicate with PE(s, q), the value of PE(s, p) is READ at edge "A" of the skew-tolerant clock and all PEs between PE(s, p) and PE(s, q) short-circuit themselves to allow the value of PE(s, p) ripple through. The value of PE(s, p) eventually arrives at PE(s, q) at edge "B". Then PE(s, q) uses it as operand and performs its operation between edge "B" and "C". The skew-tolerant clock waveform is overlaid with the the flow of the value from PE(s, p) to PE(s, q) to depict the process of avoiding the skew in a large system.

Instant Change of Clock Duration

The bottom line capability of the clock generation is that the clock duration, i.e., time between edge A and B, can be changed on a per-instruction basis. Whether this capability is to be exercised depends on the need. There will be instances in which the same duration will suffice for a long segment of the program. But there will be also instances in which one duration stays only for a period of only one instruction. As for how long between duration changes, this can be scheduled at compiling time.

BENEFITS

PREVENTING PERFORMANCE DEGRADATION

The significant performance degradation in interprocessor communication of an SIMD parallel processing system can be prevented by applying the skew-tolerant scheme described in this invention to the system. Under the skew-tolerant clock, the total time to accomplish the communication between PE(s, p) and PE(s, q) is (L+1)*2 R where L is much smaller than q−p because the source signal only needs to ripple through the PEs between PE(s, p) and PE(s, q) as opposed to be latched and retransmitted in each PE. Recalling that the time required by the conventional scheme is (q−p)*2(D+R), the saving is significant. A noticeable improvement is that instead of repeating (q−p) times of "2D" overhead to compensate for skewing, the skew-tolerant scheme only has to pay a one-time cost (i.e. one "D") to accommodate the skewing among all processing elements. Although the saving is dependent on the specific parameters that affect the skew, the scheme can accomplish a 100-fold improvement with today's components and packaging technology.

Programmability

The skew-tolerant scheme is programmable by changing the content of the "DISTANCE/LENGTH translation" table. Consequently, the scheme does not depend on the size of the system, the packaging, the layout of the processing elements and the skew characteristics of the components in the system. The programmability leads to an easy replication of the clock system in a new design.

Since the table is in memory, one can use

RAM, so that it can be loaded off-line or on-line or calculated by CPU and updated it;

ROM, so that it can be loaded at the factory or before operation only once;

PROM, so that it can be loaded and then changed; but without reloading;

EPROM, it can be loaded and changed for major change of the operating condition.

In fact, this memory can be accessed by the controller or the host so that it can be treated as part of the program or data. Therefore, whatever can be done to regular program or data memory can be done to the table. The DISTANCE/LENGTH translation tables may be loaded at the factory, and if satisfactory may be used without change. The tables may be changed by the programmer. The tables may be changed by the compiler on an automatic basis. If the host computer is fast enough, and if it has the right input data and programming, the host computer can calculate the tables directly, on line, and dispense with the tables. Tables, however, are preferred. Normally, the clock duration will be set prior to the start of execution of a program, but this is not necessary. The clock setting may be changed during running of a program. The clock setting must define a cycle time long enough for the PE-to-PE transfers, because it would be catastrophic to operate with undetermined data. Normally, each instruction will call for a specific clock duration. No instruction would normally require a variable duration, as might for example be required by the host computer in running a loop.

A program can be run on a faster or slower array processor, or a reconfiguration (change, subset or superset of the array of the same array processor) which can be optimized by tables for the new processor or configuration.

Data-Dependency and Adaptation

The variable clock duration can be changed based on the data derived at computing, in a manner such as using feature finding in the image processor to signal the host computer for a duration change. It is possible to calculate statistical worst case rather than actual worst case, but this is difficult to handle, since the array processor is not normally set up to detect the occurrence of error beyond its design worst case capability. Automatic selection of duration can also be made by the compiler. Nevertheless, the original goal is to a deterministic duration based on *a priori* knowledge of the communication. Thus, while the invention has been described with reference to a preferred embodiment, it will be understood by those skilled in the art that various changes in form and details may be made without departing from the scope of the invention.

What is claimed is:

1. A skew-tolerant array processor system, such system having a matrix of processing elements among which data is transferred from processing element to processing element and computer means from which instructions are transmitted to the processing elements, both data transfer and instruction transmission occurring as a function of a clock signal transmitted through the matrix comprising:

a programmable clock signal generator for generating a clock signal having a first edge, a second edge and a third edge, the third edge of a clock signal coinciding with the first edge of a subsequent clock signal, wherein said first edge corresponds to a READ operation, said second edge corresponds to an OPERANDS ARE AVAILABLE operation and said third edge corresponds to a WRITE operation, a first time duration occurring between said first edge and said second edge, a second time duration occurring between said second edge and said third edge, including programmable means for adjusting said first time duration of said clock signal responsive to a time period required for data to transfer between processing elements and for instructions to be received by the processing elements and said second time duration being a predetermined time, and means in each of said processing elements for responding to the corresponding operation at each of said edges of said clock pulse.

2. A skew-tolerant array processor system as set forth in claim 1, wherein said programmable means comprises a baseline clock for providing a base waveform clock signal, means for providing a duration control signal, and combinatorial means coupled to said baseline clock for receiving said base waveform clock signal and to said means for providing a duration control signal for receiving said duration control signal for providing said clock signal.

3. A skew-tolerant array processor system as set forth in claim 2, wherein said base waveform clock signal has a period twice said second time duration.

4. A skew-tolerant array processor system as set forth in claim 2, wherein said means for providing a duration control signal comprises memory means.

5. A skew-tolerant processor array as set forth in claim 2, wherein said computer means calculates said duration control signal responsive to locations in the matrix of processing elements between which data is transferred according to an instruction.

6. A skew-tolerant processor array as set forth in claim 2, wherein said combinatorial means includes shift register means.

7. A skew-tolerant array processor system as set forth in claim 4, wherein said memory means is a look-up table.

8. A clock circuit for a skew-tolerant array processor system architecture in which data travels through an array of processing elements with processor-to-processor delays which vary depending upon an instruction, comprising:

a programmable clock for providing a three-edge clock signal where a first time duration occurs between a first edge and a second edge and a second time duration occurs between a second edge and a third edge in which said first time duration is variable responsive to an instruction induced delay and said second time duration is fixed, wherein the third edge of a clock signal coincides with the first edge of a subsequent clock signal and said clock signal having a period at least twice said second time duration, and programmable means for providing a control signal to said programmable clock indicative of the instruction induced delay including a baseline clock for providing a base waveform clock signal, means for providing a duration control signal, and combinational means coupled to said baseline clock for receiving said base waveform clock signal and to said means for providing a duration control signal for receiving a duration control signal for providing said clock signal.

9. A clock circuit for a skew-tolerant array processor system as set forth in claim 8, wherein said combinational means includes shift register means.

10. A clock circuit for a skew-tolerant array processor system as set forth in claim 8, wherein said combinatorial means includes shift register means.

11. A clock circuit for a skew-tolerant array processor system as set forth in claim 8, wherein said programmable means comprises computer means and memory means.

12. A clock circuit for a skew-tolerant array processor system as set forth in claim 8, wherein said second time duration is sufficient for the instruction to be executed after the data travels from processor-to-processor.

13. A clock circuit for a skew-tolerant array processor system as set forth in claim 8, wherein said second time duration is sufficient for the instruction to be executed after the data travels from processor-to-processor.

14. A clock circuit for a skew-tolerant array processor system as set forth in claim 11, wherein said memory means is a look-up table.

15. A clock circuit for a skew-tolerant array processor system as set forth in claim 11, wherein a computer means calculates said duration control signal responsive to locations in the array of processing elements between which data is transferred according to an instruction.

* * * * *